United States Patent [19]

Wiebe

[11] 4,198,911
[45] Apr. 22, 1980

[54] SNUBBER

[75] Inventor: Donald Wiebe, Sewickley, Pa.

[73] Assignee: A. Stucki Company, Pittsburgh, Pa.

[21] Appl. No.: 906,053

[22] Filed: May 15, 1978

[51] Int. Cl.² .................... B61B 5/12; F16F 9/06; F16F 9/34
[52] U.S. Cl. .................... 105/197 DH; 188/317; 267/8 A; 267/9 A
[58] Field of Search ............ 105/197 DH; 188/317; 213/223; 267/8 A, 9 A

[56] References Cited

U.S. PATENT DOCUMENTS

| | | | |
|---|---|---|---|
| 2,379,750 | 7/1945 | Rossman | 188/317 X |
| 2,914,195 | 11/1959 | Pawling | 213/223 X |
| 3,074,708 | 1/1963 | Lush et al. | 188/317 X |
| 3,868,912 | 3/1975 | Wagner et al. | 105/197 DH |

Primary Examiner—Howard Beltran
Attorney, Agent, or Firm—Howard E. Sandler

[57] ABSTRACT

A hydraulic snubber device and more particularly, a snubber adapted to be interposed between a bolster and a side frame member and being operative to provide a first damping rate when the railway car is operating on tangent track and at equilibrium speed on super elevated track and to provide a second relatively higher damping rate when the railway car is operating on super elevated track at low speed and in all instances of severe rocking.

9 Claims, 3 Drawing Figures

SNUBBER

As is known, in the normal travel of railway cars over a rail bed, various differences in the vertical profile of the laterally spaced track resulting from such causes as staggered rail joints and super elevation of the outside track on curves gives rise to a tendency of lateral rocking or swaying of the car body. In modern cars with heavy load capacity and a relatively high center of gravity, the energy involved in the swaying can be a significant part of the total energy available in the drawbar force from a locomotive while the forces resulting from the weight shift of the car becomes so large at times that a variety of effects may develop such as:

1. Complete unloading of the wheels on one side of the truck to the extent of lifting the unloaded wheels off the rail with a high potential of derailment;
2. The imposition of extreme stresses on the car body and truck members; and
3. Cumulative damage and misalignment of track, ties, and road beds through pounding action.

Various means have been developed to alleviate the above-mentioned problems of swaying including the hydraulic snubbing devices described in U.S. Pat. Nos. 3,837,292 and 3,626,864 and U.S. patent application Ser. No. 695,803, filed June 24, 1976, which are all assigned to the same assignee as is this application. Such references illustrate hydraulic snubbers which have proved adequate to dampen the forces which give rise to excessive tendency of lateral rocking or swaying of the car body. However, in some of such prior art devices, the snubbers generally provide a substantially continuous or linear dampening rate independent of whether or not the railway cars are operating on tangent or super elevated (i.e. six inch super elevation) track. The inability of such snubbers to provide a variable dampening rate has proved to be somewhat inadequate in all instances for experience has shown that a low damping rate is advantageous when the car is operating on tangent track or at equilibrium speed on curved super elevated track and a high damping rate is advantageous when the car is operating on super elevated track at less than equilibrium speed or in instances of severe rocking. When running on tangent track, the tendency of rocking or swaying of the car body is minimal ahd hence, a relatively soft dampening rate, for example, 25 to 70 kip-seconds per foot, is desirable to insure smooth ride and minimal rebound. on the other hand, in instances of severe rocking or when running on super elevated track at less than equilibrium speed for the particular super elevation and curvature, the tendency of the rocking or swaying of the car body is at a maximim and hence a relatively high dampening rate, for example, 100 to 200 kip-seconds per foot, is desirable to insure maximum energy dissipation.

This recognition of a necessity for a variable dampening rate has been illustrated in U.S. Pat. No. 3,626,864 and in U.S. patent application Ser. No. 695,803; however, such patent and application describe a position responsive snubber device which varies the darping rate in total dependency on the vertical spacing between adjacent surfaces of the bolster and the respective side frames. The structures illustrated in these references would provide a high damping rate only upon reciprocation of the snubber piston a predetermined amount and would substantially instantaneously return to a lower damping rate when the reciprocation of the snubber piston passes through the position for a low damping rate. In other words, these structures are totally position responsive and are not at all effected by pressure build up within the snubber. Accordingly, they may operate at a high temperature when running for an extended period at positions intermediate nominal low damping rate and nominal high damping rate. Furthermore, in instances of running on poor track such snubbers will constantly shift between low and high damping rates which again will cause a heat build up and will also result in a poor ride quality.

By means of the present invention, which provides an arrangement wherein the damping rate is responsive to a pressure build up within the snubber, in addition to being position responsive, and which further provides a lag or delay when returning from the high damping rate to the low damping rate, the hereinabove mentioned problems of snubbers having only a single damping rate or of snubbers which are solely position responsive, are overcome or in the very least, greatly alleviated.

These and other objects and advantages of the present invention will become more readily apparent upon a reading of the following descriptions and drawings in which.

Figure 3:
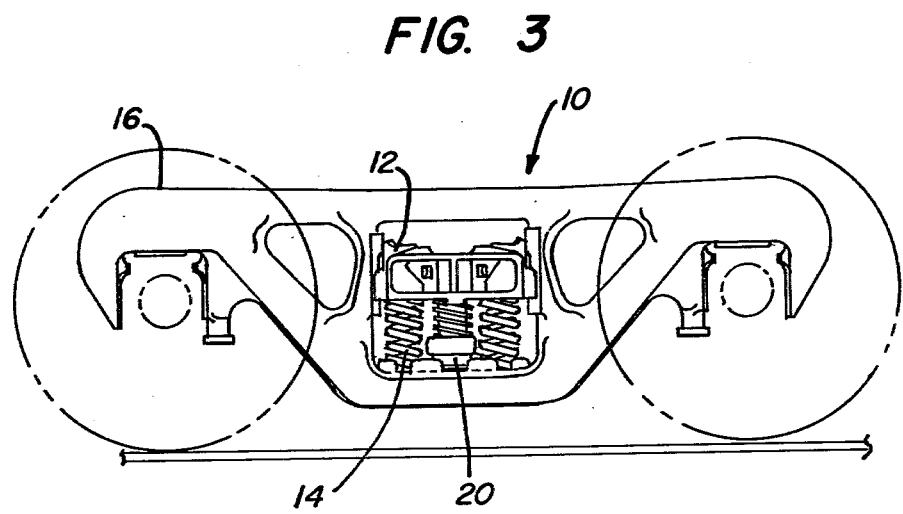
FIG. 3 is a schematic side elevational view of a freight car incorporating the snubber of the present invention therewithin.

FIG. 3 illustrates a fragmentary portion of a four wheel railway freight car, generally illustrated at 10, wherein a center plate and suitable side bearings (not shown) cooperate with a bolster 12 to support the car body (not shown). Spring groups 14 are mounted on side frames 16 (only one being shown) to support the bolster 12. A snubber of the present invention, best illustrated in FIG. 1 and generally represented by 20, is shown as being disposed in the spring group 14.

Inasmuch as the invention herein is primarily directed to snubber 20 and the balance of the elements set forth hereinabove are well known in the art, further description of such elements will not be set forth hereinafter except where necessary to describe the snubber 20.

The snubber 20 comprises: a hollow body member 32; a hollow cylindrical sleeve 34 received within body member 32; a piston assembly 36 axially reciprocal within sleeve 34; and a closure and bearing member 37 releasably carried by member 32 adjacent the lower end thereof. Body member 32 includes: a bearing and sleeve retaining portion 38 adjacent the lower end of member 32; an upper portion 40; and a radially outwardly expanded reservoir portion 42 located intermediate portions 38 and 40.

Upper portion 40 of body member 32 includes a circular opening 43 therethrough. Opening 43 has a stepped cylindrical peripheral surface and includes: a lower peripheral surface 44 having a diameter thereof substantially equal to the outer diameter of sleeve 34; an intermediate peripheral surface 46 having a diameter thereof less than the diameter of portion 44; and an upper piston rod bearing and sealing peripheral surface 48 whereat a suitable sealing means is disposed radially intermediate surface 48 and the adjacent outer periphery of piston assembly 36. A transversely extending sleeve seating surface 50 is formed at the juncture of surfaces 46 and 44. In final assembly of snubber 20, the uppermost end of sleeve 34 is firmly seated on seating surface 50.

Portion 38 of body member 32 includes a lower circular opening 52 therethrough. As shown, opening 52 is coaxially aligned with opening 43 and has a diameter thereof substantially equal to the outer diameter of closure and bearing member 37. The lower surface of member 37 has a downwardly extending convex configuration and the upper surface thereof includes a central circular depression 54 and an upwardly extending annular flange 56 thereon. The flange 56 is located intermediate the periphery of depression 54 and the outer periphery of member 37.

In final assembly member 37 is releasably and sealingly received within opening 52 in any suitable manner. As shown, the sealing relationship between member 37 and opening 52 is established by an O-ring 58 disposed in an inwardly open peripheral groove in opening 52. The releasable retention of member 37 within opening 52 is shown as being accomplished by means of snap ring 60.

Prior to final assembly, sleeve 34 with piston assembly 36 therewithin is received within body member 32. The lowermost end of sleeve 34 is captively received by the annular flange 56 being adjacent thereto and the upper end thereof engages the annular sleeve seating surface 50.

Piston assembly 36 comprises a piston head 62, and a cylindrical piston rod 64 suitably secured at the lower end thereof to piston head 62 and extending coaxially upwardly therefrom. Piston head 62 is provided with a central bore 66 therethrough which is in coaxial alignment with a blind central bore 68 in the piston rod 64.

In final assembly, a valve assembly 69 of the present invention is partially received within blind bore 68 and extends downwardly therefrom through piston heads 62. As will be more fully described hereinafter, valve assembly 69 is structured and positioned to be both position and pressure responsive to vary the damping rate of the snubber 20.

Valve assembly 69 comprises: a spring 70 which is captively mounted within the blind bore 68 axially intermediate an annular spring seating surface 72 formed within bore 68 and the uppermost surface of an axially elongated and axially reciprocal valve piston member 74. Piston member 74 includes an upper piston portion 76 which is reciprocally and slidably received within bore 68 and a lower downwardly extending piston portion 78 which extends through piston head 62 and downwardly therefrom. A central vertically extending upwardly open blind bore 80 extends from the upper most surface of the piston members 74 and has the blind end thereof positioned axially intermediate the axial ends of piston portion 78. Piston portion 78 additionally includes a plurality of radially extending circumferentially spaced bores 82 therein adjacent the lowermost end of blind bore 80, which openly communicate between bore 80 and the exterior periphery of portion 78.

A valve plug 84 with a central stepped bore 86 extending vertically therethrough is threadably received within bore 66. Stepped bore 86 includes an upper portion 88 and a lower portion 90 having a diameter thereof slightly less than the diameter of portion 88. Lower valve piston portion 78 is reciprocally received within bore 86 and the adjacent periphery thereof is in sliding relationship with the lower bore portion 90. As will be more fully described hereinafter during the operation sequence of this description, in instances where the positioning of valve assembly 69 hereof results in a low damping rate, the radial bores 82 are located downwardly from the lowermost surface of piston 62 and in instances where the positioning of valve assembly 69 results in a relatively higher damping rate, the radial bores 82 are located upwardly with respect to the lowermost surface of piston 62.

Piston head 62 includes an upper portion 92 thereof of a diameter slightly less than the inner diameter of sleeve 34 and a lower portion 94 thereof of a diameter to be in a sliding relationship with respect to sleeve 34 during the reciprocation of piston head 62. An outwardly open radially inwardly extending circumferential groove 96 is formed within piston head 62 at the juncture of portions 92 and 94 thereof. A combination valve and seal ring 98 is positioned within groove 96. Ring 98 is of an annular configuration, is preferably formed of a metallic substance, and is structured such that the inner periphery thereof engages the innermost surface of groove 96 and the outer periphery thereof engages the inner surface of cylindrical sleeve 34. The axial depth of ring 98 is less than the depth of groove 96. The piston head 62 additionally includes a plurality of circumferentially spaced passageways 100 therein which communicate between the bottom surface thereof and the groove 96.

Figure 1:
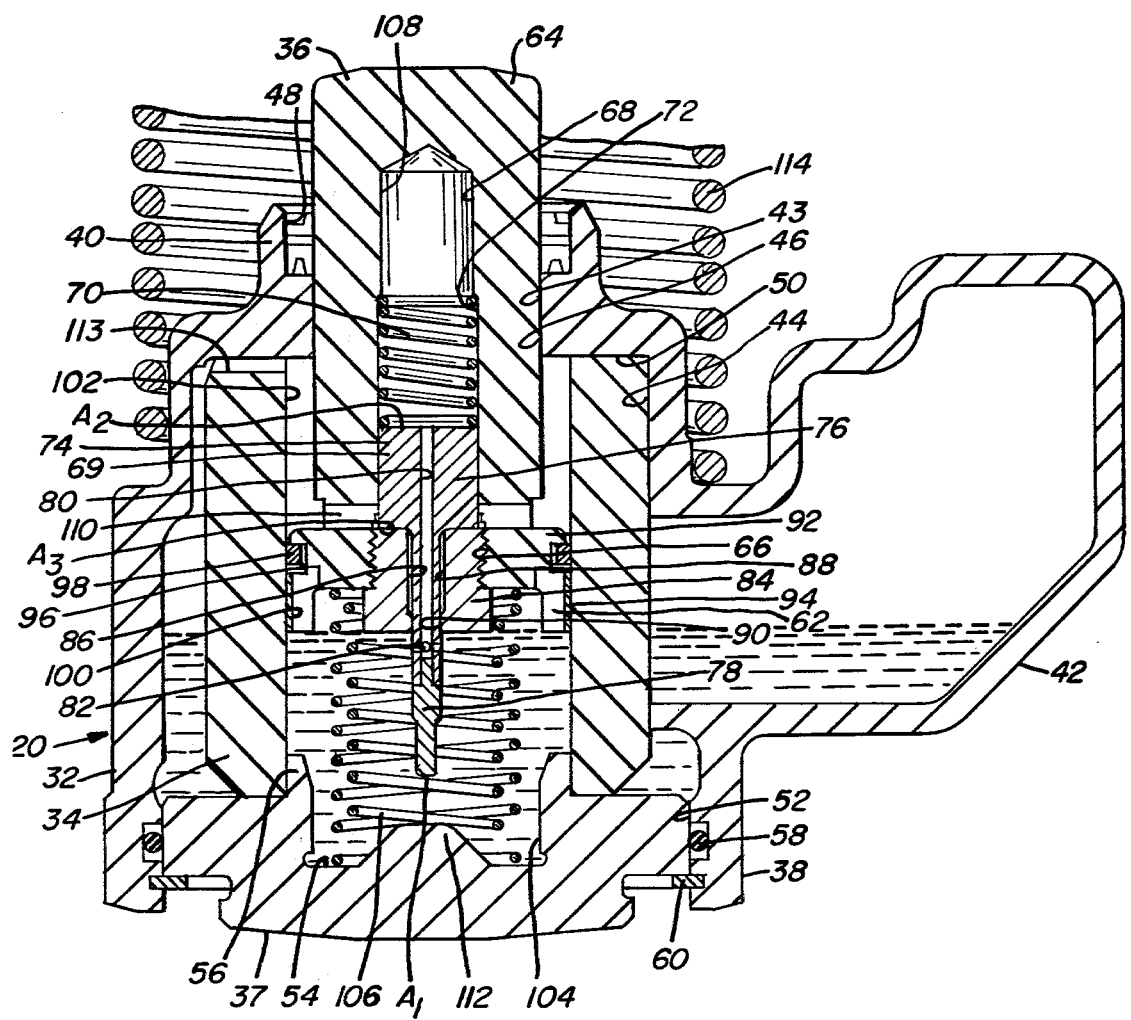
FIG. 1 is a sectional view of the snubber constructed in accordance with the principles of the present invention.

As best seen in FIG. 1, piston head 62 divides the sleeve 34 into upper and lower variable volume chambers 102 and 104, respectively. FIG. 1 illustrates the relative orientation of the components of this snubber 20 when the piston assembly 36 is moving downwardly to decrease the volume of lower chamber 104 and also when the valve assembly 69 is in such position to yield a relatively soft damping rate (i.e. 25 to 70 kip-seconds per foot) during the compression stroke of the piston assembly 36. The orientation of FIG. 1 would be the operational mode of the snubber 20 during the compression stroke thereof when the railway freight car 10 is operating on smooth track with only small vertical motions of the spring group 14. With such an orientation, the operation of snubber 20 and the primary interchange of hydraulic fluid from the lower chamber 104 to the upper chamber 102 and thence to the reservoir 42 is as follows:

1. The downward movement of piston assembly 36 overcomes the upward bias of spring 106, which is captively disposed intermediate piston head 60 and member 37 with the lower end of spring 106 being retained within depression 54.

2. Substantially simultaneously, the valve and seal ring 98 engages the downwardly facing lateral surface of groove 96 thereby effectively blocking hydraulic communication between chambers 102 and 104 via passageway 100.

3. Hydraulic fluid flows from lower chamber 104 through the radial bores 82, up through the blind bore 80 in valve piston member 74 and therefrom into a variable volume chamber 108 which is defined by the volume of blind bore 68 upwardly of valve piston member 74.

4. The hydraulic fluid now flows from chamber 108 downwardly around the annulas at the sliding clearance space between the outer periphery of upper valve piston portion 76 and the blind bore 68 and into radial passageways 110. Radial passageways 110 are formed within piston rod 64 adjacent the juncture thereof with piston head 62.

5. The hydraulic fluid flows through passageways 110, into upper chamber 102 and therefrom through a suitable passageway means, such as transverse passageway 113 through sleeve 34 adjacent the upper end thereof, and into reservoir 42.

To achieve the above mentioned hydraulic fluid flow pattern, certain parameters are to be noted. First, after initial or preliminary cycles, chambers 102, 104, and 108 are consistently maintained full of hydraulic fluid. This is accomplished by a pressurized charging of hydraulic fluid in conjunction with the maintenance of a requisite ullage volume in the reservoir 42, all as is fully explained in U.S. Pat. No. 3,837,292, assigned to the same assignee as is this invention. Secondly, a particular area-pressure relationship is to be observed to maintain the valve piston member 74 in the FIG. 2 position. For purposes of description of this area-pressure relationship: $A_1$ is the downwardly facing circular area at the lower axial end of valve piston portion 78; $A_2$ is the effective upwardly facing area at the upper axial end of valve piston portion 76; $A_3$ is the downwardly facing annular area at the juncture of valve piston portions 76 and 78; $P_1$, $P_2$, and $P_3$ refer respectively to the pressures within chambers 104, 108, and 102; and K is the downwardly directed biasing force exerted by the valve spring 70 on the valve piston member 74. Thus, when snubber 20 is operating at a relatively low damping rate during the compressions stroke thereof, $P_1$ is greater than $P_2$ which in turn is greater than $P_3$. Further, $P_1A_1 + P_3A_3$ is less than $P_2A_2 + K$. Accordingly, $A_3$ will be firmly seated on the upwardly facing surface of piston head 62 and the primary flow of pressure fluid will be as described hereinbefore. It is to be additionally noted that the spring 70 is utilized for a more positive action and need not necessarily be included within valve assembly 69 for the proper operation thereof as described hereinabove.

Figure 2:
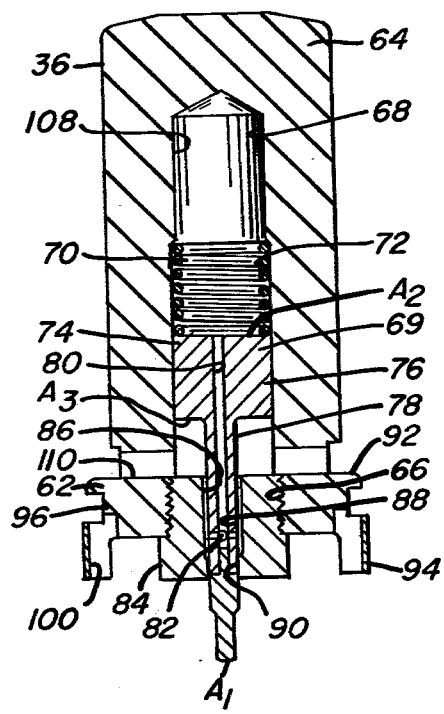
FIG. 2 is a sectional view partially illustrating the piston and valve portion of the snubber of FIG. 1 in enlarged detail and showing the valve in the high damping rate position thereof.

FIG. 2 illustrates the relative orientation of certain components of the snubber 20 when the piston assembly 36 is moving downwardly and the valve assembly 69 is in such position to yield a relatively high damping rate (i.e. 100 to 200 Kip-seconds per foot) during the compression stroke of the piston assembly 36. The orientation of FIG. 2 would be the operational mode of the snubber 20 during the compression stroke thereof when the railway freight can 10 is operating in instances of severe track roughness and/or at a resonant speed.

Furthermore, as will be more fully explained hereinafter, after either pressure or position responsive actuation of valve assembly 69, the FIG. 2 orientation will be maintained for a short period (i.e. one to three seconds) because of the fiscous nature of the fluid, coupled with the relatively narrow fluid interchange path, even though the railway freight car 10 is operating on smooth track. This maintenance of orientation or "viscous lag" of valve assembly 69 is one of the highly desirable features of the invention herein for it provides a certain continuity of operation when traveling over poor track and avoids rapid reversal of snubber modes with resultant ride effects and deleterious heat build up.

With such a FIG. 2 orientation, surface $A_3$ is spaced upwardly from the uppermost surface of piston head 62 and bores 82 have moved upwardly out of chamber 104. Thus the primary interchange or hydraulic fluid from the lower chamber 104 to the upper chamber 102 is by flow upwardly around the annulas at the sliding clearance space between the outer periphery of lower piston portion 78 and lower bore portion 90, thence through the enlarged annular space between piston portion 78 and upper bore portion 88 and therefrom through radial passageways 110 and into upper chamber 102. The more restrictive path through which the hydraulic fluid must initially flow is primarily responsible for the higher damping rate of the FIG. 2 orientation over the FIG. 1 orientation described hereinbefore. When snubber 20 is operating at the relatively higher damping rate during the compression stroke thereof, $P_1$ is much greater than $P_2$ and $P_3$ and $P_2$ is substantially equal to $P_3$. Further, $P_1A_1$ plus $P_3A_3$ is greater than $P_2A_2$ plus K. Accordingly, $A_3$ will be spaced upwardly from piston head 62 so long as this relationship is maintained. When the pressure in lower chamber 104 is lessened, the viscous nature of the hydraulic fluid will prevent an instantaneous return of the valve assembly 69 to a low damping rate and this "lag" will be present until leakage or zero motion permits gravitational and/or spring 70 forces to result in the return of valve assembly 69 to the FIG. 1 orientation.

The initial actuation of valve assembly 69 from the lower to the higher damping modes occurs by either position or pressure responsive means. In the position responsive actuation the compression stroke of piston assembly 36 is of such a length that the $A_1$ of valve piston member 74 engages an upwardly extending button 112 formed within a central portion of member 37. This engagement forces the piston member 74 upwardly to the FIG. 2 orientation.

In the pressure responsive actuation longer and more frequent reciprocation of the piston assembly 36 causes sufficiently high pressure pulses within lower chamber 104 to shift the valve assembly 69 upwardly with each stroke. Specifically, pressure build up results in an area pressure relationship of $P_1A_1$ being greater than $P_2A_2$ plus K. The valve piston member 74 will move upwardly to the FIG. 2 position if the pressure difference provides for either single long strokes or incremental upward pulses after a number of strokes.

The flow pattern of the hydraulic fluid during the expansion stroke of the snubber 20 is primarily as described in aforementioned U.S. Pat. No. 3,837,292 with the primary distinction therebetween being that the present invention includes the valve and seal ring 98. Accordingly, during the expansion stroke, the ring 98 engages the upwardly facing lateral surface of groove 96 thereby opening hydraulic communication between chambers 102 and 104 via passageways 100. Thus ring 98 and the supporting structure therefor serve the dual purpose of providing the necessary sealing adjacent the periphery of piston head 62 while simultaneously providing a valve means for the relatively free flow of hydraulic fluid during the expansion stroke of the snubber 10.

The particular embodiment described herein is a presently preferred embodiment of the snubber 20; however, it is to be understood that those skilled in the art may make modifications to the embodiment described herein without departing from the scope of the invention. For example: the snubber 20 may be retained in position by body spring 114 or by other suitable means if so desired; valve assembly 69 need not necessarily include the spring 69; alternative configurations to body member 32 are contemplated, and the like.

Having described an embodiment of the invention as is presently preferred, it is understood that the scope of the invention herein is not restricted by such description and that the scope of the invention herein is defined by the claims set forth hereinafter.

What is claimed is:

1. A hydraulic snubber device adapted to be disposed within a spring group of a railway truck assembly comprising: a housing; a piston member axially reciprocable within said housing and defining axially spaced upper and lower variable volume hydraulic fluid chamber portions within said housing; elongated valve means cooperable with said piston member and having a portion thereof reciprocable along an axis extending in the same direction as the direction of reciprocation of said piston member to cause said valve means to be operable in first and second operational modes; in said first operational mode said valve means providing a larger degree of hydraulic communication between said chamber portions than in said second operational mode; and said valve means being independently reciprocable from operation in said first operational mode to operation in said second operational mode by response to hydraulic fluid pressure within one of said chamber portions and also by mechanical response to the axial position of said piston member.

2. A hydraulic snubber device as specified in claim 1 wherein said first operational mode normally occurs when such a railway truck assembly is running on smooth track and said second operational mode normally occurs when such a railway truck assembly is running on severly rough track.

3. A hydraulic snubber device as specified in claim 1 wherein said valve means are structured such that, in all instances of normal operation thereof, when returning from said second operational mode to said first operational mode substantially no less than one second elapses.

4. A hydraulic snubber device as specified in claim 1 wherein said one of said chambers portions is said lower chamber portion.

5. A hydraulic snubber device as specified in claim 4 wherein said valve means includes a lower portion thereof extending into said lower chamber portion and said mechanical response is by cooperation between said lower portion of said valve means and a lowermost portion of said housing.

6. A hydraulic snubber device as specified in claim 4 additionally including biasing means operable to bias said valve means away from the other of said chamber portions and toward said one of said chamber portions.

7. A hydraulic snubber device as specified in claim 6 wherein said biasing means, said valve means and said piston member are coaxial with respect to the axis of reciprocation of said piston member.

8. A hydraulic snubber device adapted to be disposed within the spring group of a railway truck assembly comprising: a housing; a piston member axially reciprocable within said housing and defining axially spaced upper and lower variable volume hydraulic fluid chamber portions within said housing; valve means cooperable with said piston member and operable in first and second operational modes; in said first operational mode said valve means providing a larger degree of hydraulic communication between said chamber portions than in said second operational mode; said valve means are operable in response to hydraulic fluid pressure within one of said chamber portions; and said valve means are structured such that, in all instances of normal operation thereof, when returning from said second operational mode to said first operational mode substantially at least one second elapses.

9. A hydraulic snubber device as specified in claim 8 wherein said one of said chamber portions is the lower of said chamber portions.